(12) United States Patent
Dutt et al.

(10) Patent No.: US 6,236,483 B1
(45) Date of Patent: May 22, 2001

(54) OPTICAL CDMA SYSTEM USING SUB-BAND CODING

(75) Inventors: Birendra Dutt, Westchester; Manouher Naraghi, Torrance; James K. Chan, Rancho Palos Verdes, all of CA (US)

(73) Assignee: CodeStream Technologies Corporation, Richardson, TX (US)

( * ) Notice: Subject to any disclaimer, the term of this patent is extended or adjusted under 35 U.S.C. 154(b) by 0 days.

(21) Appl. No.: 09/126,217

(22) Filed: Jul. 30, 1998

(51) Int. Cl.[7] .............................. H04J 14/08; H04B 10/00
(52) U.S. Cl. ........................ 359/136; 359/154; 359/173
(58) Field of Search .................... 370/320, 335, 370/342, 441; 359/136, 181, 193, 189, 154, 173

(56) References Cited

U.S. PATENT DOCUMENTS

| | | | |
|---|---|---|---|
| 3,873,825 | 3/1975 | Jones et al. | 250/199 |
| 4,449,385 | 5/1984 | Thirion et al. | 70/277 |
| 4,703,474 | 10/1987 | Foschini et al. | 370/18 |
| 4,901,307 | 2/1990 | Gilhousen et al. | 370/18 |
| 5,177,768 | 1/1993 | Crespo et al. | 375/1 |
| 5,289,299 | 2/1994 | Paek et al. | 359/29 |
| 5,351,147 | 9/1994 | Frenkel | 359/124 |
| 5,410,147 | 4/1995 | Riza et al. | 250/214 |
| 5,438,440 | 8/1995 | Paek et al. | 359/11 |
| 5,519,526 | 5/1996 | Chua et al. | 359/152 |
| 5,579,143 | 11/1996 | Huber | 359/130 |
| 5,602,833 | 2/1997 | Zehavi | 370/209 |
| 5,760,941 | 6/1998 | Young et al. | 359/181 |

FOREIGN PATENT DOCUMENTS

| | | |
|---|---|---|
| 0031027 | 11/1980 | (EP) . |
| 0157692 | 10/1985 | (EP) . |
| 0782288 | 7/1997 | (EP) . |
| 9610163 | 4/1996 | (WO) . |
| WO 98/23057 | 5/1998 | (WO) . |

OTHER PUBLICATIONS

Park et al., "Polarity–Reversing Type Photonic Receiving Scheme for Optical CDMA Signal in Radio Highway," IEICE Trans Electron, vol. E81–C, No. 3, Mar. 1998, pp. 462–467.

(List continued on next page.)

*Primary Examiner*—Jason Chan
*Assistant Examiner*—Christina Y Leung
(74) *Attorney, Agent, or Firm*—Haynes and Boone, LLP

(57) ABSTRACT

An optical fiber communications system using spread spectrum code division multiple access techniques to achieve better bandwidth utilization. A transmitting user in the system encodes the optical signal using a first coding mask, and a receiving user decodes the received signal using two decoding masks, all of the masks having lengths N. The first mask is divided into two sections of lengths N/2 each, one of the sections defining a first sub-code of length N/2, while the other section blocks light. Each of the second and third masks is also divided into two sections, which correspond to the two sections of the first mask. The section of the second mask corresponding to the coded section of the first mask has a second code that is identical to the first code, and the section of the second mask corresponding to the blocked section of the first mask is also blocked. The section of the third mask corresponding to coded section of the first mask has a third code that is complementary to the first code, and the section of the third mask corresponding to the blocked section of the first mask is also blocked. Some users on the system have masks in which the first of the two sections are blocked and the second of the two sections are coded, while other users have masks in which the second of the two sections are blocked and the first of the two sections are coded. The first codes used to code the encoding masks are selected from a set of unipolar codes that are derived from a set of balanced bipolar orthogonal codes.

3 Claims, 7 Drawing Sheets

OTHER PUBLICATIONS

Weiner et al., "Programmable femotosecond pulse shaping by use of a multielement liquid–crystal phase modulator," *Optics Letters,* Mar. 15, 1990, No. 6, pp. 326–328.

Wefers, Marc M. and Keith A. Nelson, "Programmable phase and amplitude femotosecond pulse shaping," *Optics Letters,* Dec. 1, 1993, vol. 18, No. 23, pp. 2032–2034.

Kavehrad, M. and D. Zaccarin, "Optical Code–Division–Multiplexed Systems Based on Spectral Encoding of Noncoherent Sources," *Journal of Lightwave Technology,* Mar. 1995, vol. 13, No. 3, pp. 534–545.

Hassan et al., "Spatial Optical CMDA," *IEEE Journal,* Apr. 13, 1995, No. 3, pp. 609–613.

Decusatis et al., "Hybrid optical implementation of discrete wavelet transforms: a tutorial," *Optics and Laser Technology,* 1966, vol. 28, No. 2, pp. 51–58.

Zaccarin, D. and M. Kavchrad, "An Optical CDMA System Based on Spectral Encoding of LED," *IEEE Photonics Technology Letters,* Apr. 1993, vol. 4, No. 4, pp. 479–482.

Salehi, Jawad A., "Code Division Multiple–Access Techniques in Optical Fiber Networks—Part I: Fundamental Principles," *IEEE Transactions on Communications,* Aug. 1989, vol. 37, No. 8, pp. 824–833.

Salehi, Jawad A. and Charles A. Brackett, "Code Division Multiple–Access Techniques in Optical Fiber Networks—Part II: Systems Performance Analysis," *IEEE Transactions on Communications,* Aug. 1989, vol. 37, No. 8, pp. 824–833.

Chung et al., "Optical Orthogonal Codes: Design, Analysis, and Applications," *IEEE Transactions on Information Theory,* May 1989, vol. 35, No. 3., pp. 595–604.

Nelson, Laurie B. and H. Vincent Poor, "Performance of Multiuser Detection for Optical CDMA—Part I: Error Probabilities," *IEEE Transactions on Communications,* Nov. 1995, vol. 43, No. 11.

Nguyen, Lim, "Principle and Practice of Optical Code–Division Multiple Access Communication," Oct. 12, 1995, pp. 10.

Nguyen et al., "All–optical CDMA with bipolar codes," *Electronics Letters,* Mar. 1995, vol. 31, No. 6, pp. 469–470.

Nguyen et al., "Optical CDMA with Spectral Encoding and Bipolar Codes," in Proceedings of the 29th Annual Conference on Information Sciences and Systems, John Hopkins University, Baltimore, MD, Mar. 1995, pp. 1–4.

Nguyen et al., "BER of Optical Communication System Using Fiber Source," in Proceedings of the 1995 IEEE International Symposium on Information Theory, Whistler, B.C., Canada, Sep. 1995, p. 480.

Nguyen et al., "Photocurrent Distribution of a Superfluorescent Fiber Source," in Technical Proceedings of the LEOS '95 Conference, San Francisco, CA, Oct. 30,—Nov. 2, 1995, p. 1–2.

Nguyen et al., "Photoelectric Current Distribution and Bit–Error Rate in Optical Communication Systems Using a Superfluorescent Fiber Source," *IEEE Journal of Lightwave Technology,* May 1995, pp. 1–20.

Nguyen et al., "Demonstration of Bipolar Codes for Direct Detection Multi–User Optical Communication," submitted to IEEE Optical Society of America Optical Fiber Conference, 1996, p. 1–3.-

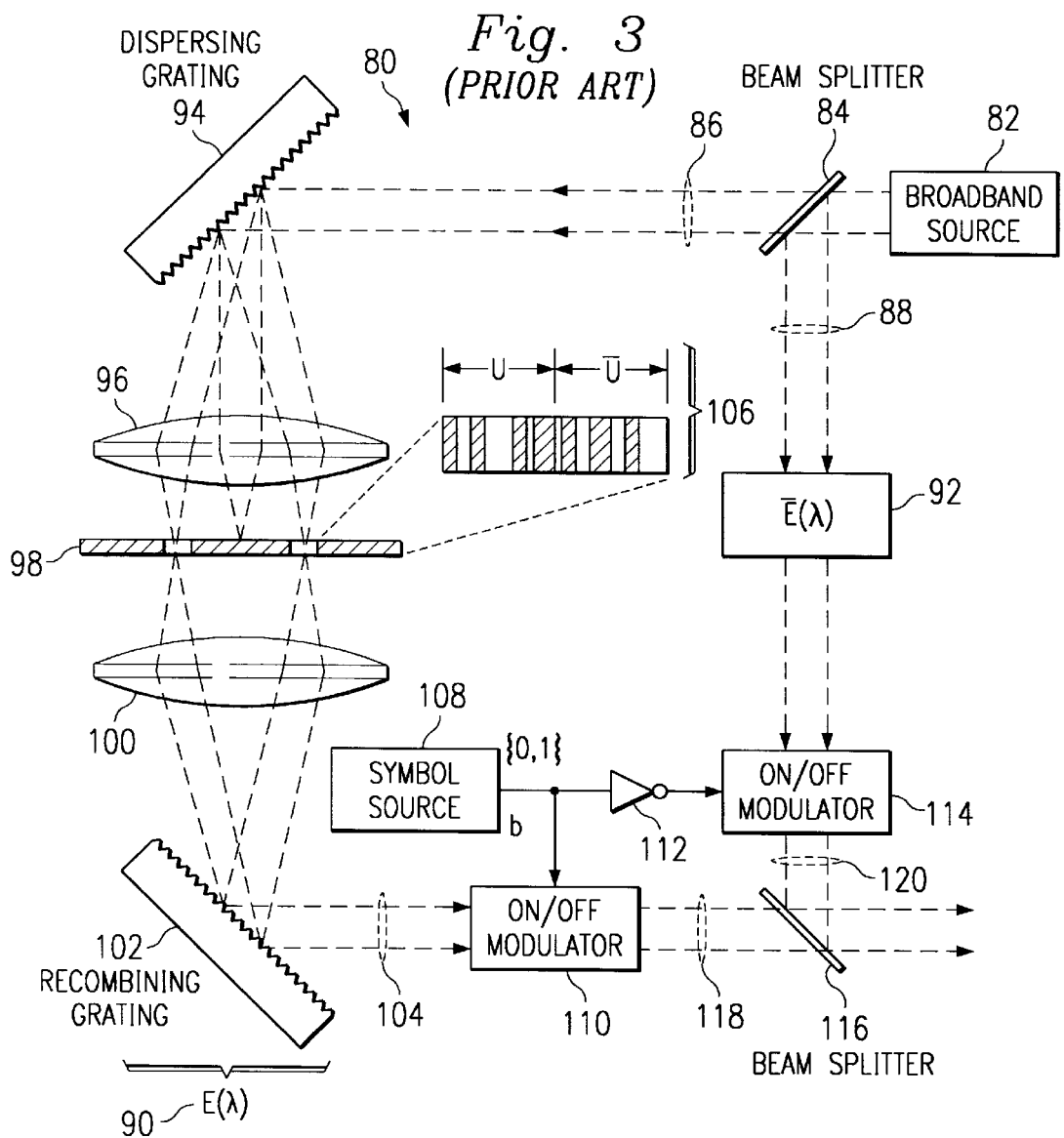
Fig. 3 *(PRIOR ART)*
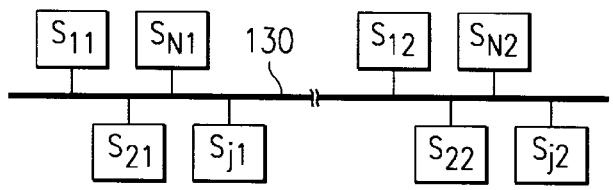
Fig. 4
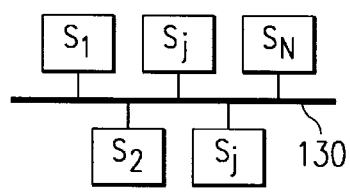
Fig. 5

OPTICAL CDMA SYSTEM USING SUB-BAND CODING

BACKGROUND OF THE INVENTION

1. Field of the Invention

This invention relates to optical communication systems and, more particularly, to optical code-division multiple access communications systems that transmit data over optical fibers.

2. Description of the Related Art

Recent years have seen rapidly expanding demands for communications bandwidth, resulting in the rise of technologies such as satellite communications, video programming distribution networks such as cable television, and spread-spectrum telephony including, for example, code-division multiple access telephony. Such technologies have become common and well integrated into everyday communications. Growing demand for communications bandwidth has brought significant investments in new communications technologies and in new communications infrastructure. For example, the cable television industry, telephone companies, Internet providers and various government entities have invested in long distance optical fiber networks and in equipment for fiber networks. The addition of this infrastructure has, in turn, spurred demand for bandwidth use, resulting in demand for yet additional investment in new technologies and infrastructure.

Installing optical fibers over long distances is expensive. Additionally, conventional optical fiber or other optical communication networks utilize only a small fraction of the available bandwidth of the communication system. There is consequently considerable interest in obtaining higher utilization of fiber networks or otherwise increasing the bandwidth of optical fiber systems. Techniques have been developed to increase the bandwidth of optical fiber communication systems and to convey information from plural sources over a fiber system. Generally, these techniques seek to use more of the readily available optical bandwidth of optical fibers by supplementing the comparatively simple coding schemes conventionally used by such systems. In some improved bandwidth fiber systems, the optical fiber carries an optical channel on an optical carrier signal consisting of a single, narrow wavelength band and multiple users access the fiber using time-division multiplexing (TDM) or time-division multiple access (TDMA). Time division techniques transmit frames of data by assigning successive time slots in the frame to particular communication channels. Optical TDMA requires short-pulsed diode lasers and provides only moderate improvements in bandwidth utilization. In addition, improving the transmission rates on a TDM network requires that all of the transceivers attached to the network be upgraded to the higher transmission rates. No partial network upgrades are possible, which makes TDM systems less flexible than is desirable. On the other hand, TDM systems provide a predictable and even data flow, which is very desirable in multi-user systems that experience "bursty" usage. Thus, TDM techniques will have continued importance in optical communications systems, but other techniques must be used to obtain the desired communications bandwidth for the overall system. Consequently, it is desirable to provide increased bandwidth in an optical system that is compatible with TDM communication techniques.

One strategy for improving the utilization of optical communication networks employs wavelength-division multiplexing (WDM) or wavelength-division multiple access (WDMA) to increase system bandwidth and to support a more independent form of multiple user access than is permitted by TDM. WDM systems provide plural optical channels each using one of a set of non-overlapping wavelength bands to provide expanded bandwidth. Information is transmitted independently in each of the optical channels using a light beam within an assigned wavelength band, typically generated by narrow wavelength band optical sources such as lasers or light emitting diodes. Each of the light sources is modulated with data and the resulting modulated optical outputs for all of the different wavelength bands are multiplexed, coupled into the optical fiber and transmitted over the fiber. The modulation of the narrow wavelength band light corresponding to each channel may encode a simple digital data stream or a further plurality of communication channels defined by TDM. Little interference will occur between the channels defined within different wavelength bands. At the receiving end, each of the WDM channels terminates in a receiver assigned to the wavelength band used for transmitting data on that WDM channel. This might be accomplished in a system by separating the total received light signal into different wavelengths using a demultiplexer, such as a tunable filter, and directing the separated narrow wavelength band light signals to receivers assigned to the wavelength of that particular channel. At least theoretically, the availability of appropriately tuned optical sources limit the number of users that can be supported by a WDM system. Wavelength stability, for example as a function of operating temperature, may also affect the operational characteristics of the WDM system.

As a more practical matter, the expense of WDM systems limits the application of this technology. One embodiment of a WDM fiber optic communication system is described in U.S. Pat. No. 5,579,143 as a video distribution network with 128 different channels. The 128 different channels are defined using 128 different lasers operating on 128 closely spaced but distinct wavelengths. These lasers have precisely selected wavelengths and also have the well-defined mode structure and gain characteristics demanded for communications systems. Lasers appropriate to the WDM video distribution system are individually expensive so that the requirements for 128 lasers having the desired operational characteristics make the overall system extremely expensive. The expense of the system makes it undesirable for use in applications such as local area computer networks and otherwise limits the application of the technology. As is described below, embodiments of the present invention can provide a video distribution network like that described in U.S. Pat. No. 5,579,143, and embodiments of the invention can provide other types of medium and wide area network applications, making such systems both more flexible and more economical. Unlike the multiple laser WDM system of U.S. Pat. No. 5,579,143, embodiments of the present invention may be sufficiently flexible and cost effective to be used in at least some types of local area networks.

Embodiments of the present invention, as described below, use spread spectrum communication techniques to obtain improved loading of the bandwidth of an optical fiber communication system in a more cost-effective manner than known WDM systems. Spread spectrum communication techniques are known to have significant advantages and considerable practical utility, most notably in secure military applications and mobile telephony. There have consequently been suggestions that spread spectrum techniques, most notably code-division multiple access (CDMA), could be applied to optical communications technologies. Spread spectrum techniques are desirable in optical communications systems because the bandwidth of optical communications systems, such as those based on optical fibers, is sufficiently large that multi-dimensional coding techniques can be used without affecting the data rate of any electrically generated signal that can presently be input to the optical communications system. Different channels of data can be defined in the frequency domain and independent data streams can be supplied over the different channels without limiting the data rate within any one of the channels. From a simplistic point of view, the WDM system described above might be considered a limiting case of a spread spectrum system in that plural data channels are defined for different wavelengths. The different wavelength channels are defined in the optical frequency domain and time domain signals can be transmitted over each of the wavelength channels. From a CDMA perspective, the distinct wavelength channels of the WDM communication system described above provide a trivial, single position code, where individual code vectors are orthogonal because there is no overlap between code vectors.

There have been suggestions for optical CDMA systems that are generally similar to traditional forms of radio frequency CDMA, for example in Kavehrad, et al., "Optical Code-Division-Multiplexed Systems Based on Spectral Enoding of Noncoherent Sources," *J. Lightwave Tech.*, Vol. 13, No. 3, pp. 534–545 (1995). As opposed to the WDM system described above, the suggested optical CDMA system uses a broad-spectrum source and combines frequency (equivalently, wavelength) encoding in addition to time-domain encoding. A schematic illustration of the theoretical optical CDMA suggested in the Kavehrad article is presented in FIG. 1. The suggested optical CDMA system uses a broad-spectrum, incoherent source 12 such as an edge-emitting LED, super luminescent diode or an erbium-doped fiber amplifier. In the illustrated CDMA system, the broad-band source is modulated with a time-domain data stream 10. The time domain modulated broad-spectrum light 14 is directed into a spatial light modulator 16 by a mirror 18 or other beam steering optics.

Within the spatial light modulator 16, light beam 20 is incident on a grating 22, which spatially spreads the spectrum of the light to produce a beam of light 24 having its various component wavelengths spread over a region of space. The spatially spread spectrum beam 24 is then incident on a spherical lens 26 which shapes and directs the beam onto a spatially patterned mask 28, which filters the incident light. Light spatially filtered by the mask 28 passes through a second spherical lens 30 onto a second diffractive grating 34, which recombines the light. Mask 28 is positioned midway between the pair of confocal lenses 26, 30 and the diffraction gratings 22, 34 are positioned at the respective focal planes of the confocal lens pair 26, 30. The broad optical spectrum of the incoherent source is spatially expanded at the spatially patterned mask 28 and the mask spatially modulates the spread spectrum light. Because the spectrum of the light is spatially expanded, the spatial modulation effects a modulation in the wavelength of the light or, equivalently, in the frequency of the light. The modulated light thus has a frequency pattern characteristic of the particular mask used to modulate the mask. This frequency pattern can then be used to identify a particular user within an optical network or to identify a particular channel within a multi-channel transmission system.

After passing through the mask 28, the spatially modulated light passes through the lens 30 and the wavelength modulated light beam 32 is then spectrally condensed by the second grating 34. The wavelength modulated and spectrally condensed light beam 36 passes out of the spatial light modulator 16 and is directed by mirror 38 or other beam steering optics into a fiber network or transmission system 42. The portion of the CDMA system described to this point is the transmitter portion of the system and that portion of the illustrated CDMA system down the optical path from the fiber network 42 constitutes the receiver for the illustrated system. The receiver is adapted to identify a particular transmitter within a network including many users. This is accomplished by providing a characteristic spatial mask 28 within the transmitter and detecting in the receiver the spatial encoding characteristics of the transmission mask from among the many transmitted signals within the optical network. As set forth in the Kavehrad article, it is important for the mask 28 to be variable so that the transmitter can select from a variety of different possible receivers on the network. In other words, a particular user with the illustrated transmitter selects a particular receiver or user to receive the transmitted data stream by altering the spatial pattern of the mask 28, and hence the frequency coding of the transmitted beam 40, so that the transmitter mask 28 corresponds to a spatial coding characteristic of the intended receiver.

The receiver illustrated in FIG. 1 detects data transmitted from a particular transmitter by detecting the frequency or wavelength modulation characteristic of the transmitter mask 28 and rejecting signals having different characteristic frequency modulation patterns. Light received from the optical fiber network 42 is coupled into two different receiving channels by coupler 44. The first receiver channel includes a spatial light modulator 46 identical to the spatial light modulator 16 and the second receiver channel includes a spatial light modulator 48 of similar construction to the transmitter's spatial light modulator 16, but having a mask the "opposite" of the transmitter mask 28. Each of the spatial light modulators 46, 48 performs a filtering function on the received optical signals and each passes the filtered light out to an associated photodetector 50, 52. Photodetectors 50, 52 detect the filtered light signals and provide output signals to a differential amplifier 54. The output of the differential amplifier is provided to a low pass filter 56 and the originally transmitted data 58 are retrieved.

FIG. 2 provides an illustration of the receiver circuitry in greater detail. In this illustration, spatial light modulators 46 and 48 are generally similar to the spatial light modulator 16 shown in FIG. 1 and so individual components of the systems are not separately described. Received light 60 is input to the receiver and is split using coupler 62, with a portion of the light directed into spatial light modulator 46 and another portion of the light directed into the other spatial light modulator 48 using mirror 64. Spatial light modulator 46 filters the received light 60 using the same spatial (frequency, wavelength) modulation function as is used in the transmitter's spatial light modulator 16 and provides the filtered light to photodetector 50. Spatial light modulator 48 filters the received light using a complementary spatial filtering function and provided the output to the detector 52. Amplifier 54 provided subtracts the output signals from the two photodetectors. To effect the same filtering function as the transmitter's spatial light modulator 16, the spatial light modulator 46 includes a mask 66 identical to the transmitter mask 28. Spatial light modulator 48 includes a mask 68 that performs a filtering function complementary to masks 28 and 66 so that spatial light modulator 48 performs a filtering function complementary to the filtering function of spatial light modulators 16, 46. In the Kavehrad article, each of these masks 16, 66, 68 is a liquid crystal element so that the masks are fully programmable.

The particular codes embodied in the masks must be appropriate to the proposed optical application. Although CDMA has been widely used in radio frequency (RF) domain communication systems, its application in frequency (wavelength) domain encoding in optical systems has been limited. This is because the success of the RF CDMA system depends crucially on the use of well-designed bipolar code sequences (i.e., sequences of +1 and −1 values) having good correlation properties. Such codes include M-sequences, Gold sequences, Kassami sequences and orthogonal Walsh codes. These bipolar codes can be used in the RF domain because the electromagnetic signals contain phase information that can be detected. RF CDMA techniques are not readily applicable to optical systems in which an incoherent light source and direct detection (i.e., square-law detection of the intensity using photodetectors) are employed, because such optical systems cannot detect phase information. Code sequences defining negative symbol values cannot be used in such optical systems. As a result, only unipolar codes, i.e., code sequences of 0 and 1 values, can be used for CDMA in a direct-detection optical system.

The Kavehrad article suggests the adaption of various bipolar codes for the masks within the system illustrated in FIGS. 1 & 2, including masks provided with a unipolar (only 0's and 1's) M-sequence or a unipolar form of a Hadamard code. For these sorts of bipolar code, the Kavehrad article indicates that the bipolar code of length N must be converted into a unipolar code sequence of length 2N and that a system including such codes could support a total of N−1 users. The Kavehrad article addresses only a theoretical application of a CDMA system, with little discussion of the implementation of such a system.

A more practical example of an optical CDMA system including a converted bipolar code sequence has been proposed for transmission and detection of bipolar code sequences in a unipolar system. This system is described in a series of papers by L. Nguyen, B. Aazhang and J. F. Young, including "Optical CDMA with Spectral Encoding and Bipolar Codes," Proc. 29th Annual Conf. Information Sciences and Systems (Johns Hopkins University, Mar. 22–24, 1995), and "All-Optical CDMA with Bipolar Codes", Elec. Lett., Mar. 16th, 1995, Vol. 3, No. 6, pp. 469–470. This work is also summarized in U.S. Pat. No. 5,760,941 to Young, et al., and this work is collectively referenced herein as the Young patent. In this system, schematically illustrated in FIG. 3, the transmitter 80 employs a broad spectrum light source 82 which is split by a beam splitter 84 into two beams 86 and 88 to be processed by two spatial light modulators 90 and 92. The first spatial light modulator 90 comprises a dispersion grating 94 to spectrally disperse the light beam 86 and a lens 96 to direct the dispersed light onto a first spatial encoding mask 98 which selectively passes or blocks the spectral components of the light beam. Lens 100 collects the spectral components of the spatially modulated light beam and recombination grating 102 recombines the spread beam into encoded beam 104. The "pass" and "block" state of the encoding masks represent a sequence of 0's and 1's, i.e., a binary, unipolar code. The code 106 for the first mask 98 has a code U⊗U*, where U is a unipolar code of length N, U* is its complement and "⊗" denotes the concatenation of the two codes. The second encoder 92 (details not shown) is similar in structure to the first encoder 90 except that its encoding mask has a code U*⊗U. Symbol source 108 outputs a sequence of pulses representing 0's and 1's into a first ON/OFF modulator 110 and through an inverter 112 into a second ON/OFF modulator 114. The two modulators 110 and 114 modulate the two spatially modulated beams of light and the two beams are combined using a beam splitter 116 to combine the two encoded light beams 118 and 120. The modulated light beams are alternately coupled to the output port depending on whether the bit from the source is 0 or 1.

This system can then use a receiver with differential detection of two complementary channels, as illustrated in the receiver of FIG. 2. The receiving channels are equipped with masks bearing the codes U*⊗U and U⊗U*, respectively, and sequences of 0's and 1's are detected according to which channel receives a signal correlated to that channel's mask. The system proposed in the Young patent allows the use of the bipolar codes developed for RF CDMA technologies to be used in optical CDMA systems. However, for a mask of length 2N, only N codes can be defined since the code U and its complement U* must be concatenated on the mask.

Therefore, it is an object of the invention to provide a frequency-domain CDMA encoding/decoding scheme and an optical communication system incorporating such a scheme where the number of users is maximized without raising interference unduly. It is another object of the invention to provide a system providing a relatively simple system for encoding and decoding the light but efficiently using the entire spectrum available.

The throughput of an optical fiber based communication system is defined as the product of each user's data rate times the number of user pairs. The throughput of an optical fiber communication system is a function of the optical source power of the users, the optical source bandwidth, user data rate, the number of users and the desired bit error rate (BER). In many such systems, the limiting factor is the user-to-user interference, which is independent of the optical source power. Such interference imposes a maximum data rate at which the users may transmit information. It is an object of the present invention to increase the system throughput of spread spectrum CDMA communications systems.

SUMMARY OF THE PREFERRED EMBODIMENTS

These and other objects are obtained using a spatial encoder with binary or analog encoding and a receiver corresponding to the encoder. In particular, a broad-spectrum light source is modulated with data to be transmitted. The modulated light beam is then dispersed using, for example, a diffraction grating and passed through a spatially patterned, spectrum-encoding mask. The spatially patterned mask preferably provides a unipolar code belonging to a set of unipolar codes that may be derived from a set of balanced bipolar orthogonal codes. Most preferably, the encoding mask has an array of N cells arranged in the direction in which the light is dispersed, the cells attenuating different spectral components of the dispersed light according to the chosen code. The mask may be a binary mask, in which each cell is either transparent or opaque, and the code of the mask is a binary code comprising a sequence of 0's and 1's. Alternately, the mask may be analog, with the opacity of each cell of the mask adjustable in at least three levels, and the code of the mask is an analog fuinction representing the opacity of the cells. After the spatially spread light beam is spatially modulated, the spread spectrum of the encoded modulated light beam is then recombined to provide a modulated, encoded spread spectrum optical signal for injection into an optical fiber or another optical communication system.

Recovery of the transmitted signal is through the use of a special, matched filter. At any receiver, a beam splitter diverts part of the beam from the fiber through a diffraction grating to spatially separate the spectrum of the light in the fiber. The spatially spread signal, potentially comprising a plurality of spread spectrum optical communications, is passed to a receiver providing signal recovery. The receiver can be implemented in a number of ways, but preferably includes a pair of masks, with one of the receiving masks the same as the encoding mask and the other receiving mask the complement of the encoding mask. A received optical signal is filtered through both of the receiving masks and the transmitted data are recovered by performing differential data detection on the two complementarily filtered received signals.

Particularly preferred embodiments of the present invention provide a sub-band coding method whereby interference between different users on a system is reduced by limiting the extent a given spatial spectrum that is consumed by the code for any one user. For example, in a system of N users, the users could be divided into two groups each including N/2 users. The first of the groups would use a code space spanning one half of the available spatial spectrum. The other of the groups would use a second, distinct code space spanning the other half of the available spatial spectrum.

According to this example, the encoding mask, which has N cells (N being an even number), is subdivided into two sections of N/2 cells each. The first section is blocked, i.e., all the cells in that section are opaque (the blocked section); while the second section is coded with a code u of length N/2 (the coded section). Each decoding mask in the corresponding decoder is also subdivided into two sections of N/2 cells so that each corresponds to the blocked and the coded sections of the encoding mask. In each decoding mask, the section that corresponds to the blocked section in the encoding mask is also blocked. In one of the decoding masks, the section that corresponds to the coded section of the encoding mask is coded with a code u that is identical to the code of the coded section of the encoding mask. In the other decoding mask, the section that corresponds to the coded section of the encoding mask is coded with a code u* that is complementary to the code of the coded section of the encoding mask.

Each encoding mask used in the system may have either one of the two sections blocked, and the other section coded with a code u of length N/2. The code u is selected from a set of unipolar codes derived from a set of balanced bipolar orthogonal codes, the set containing N/2 codes.

This general strategy can be employed for various groupings of users within an overall user population. For example, if the N users were divided into four groups, each of the four groups would be identified by a code that spanned one fourth of the available spectrum.

BRIEF DESCRIPTION OF THE DRAWINGS

FIG. 3 illustrates an encoder for using bipolar codes in an optical CDMA system.

FIGS. 4 & 5 present different configurations of an optical fiber network according to the present invention.

RELATED APPLICATIONS

Figure 1:
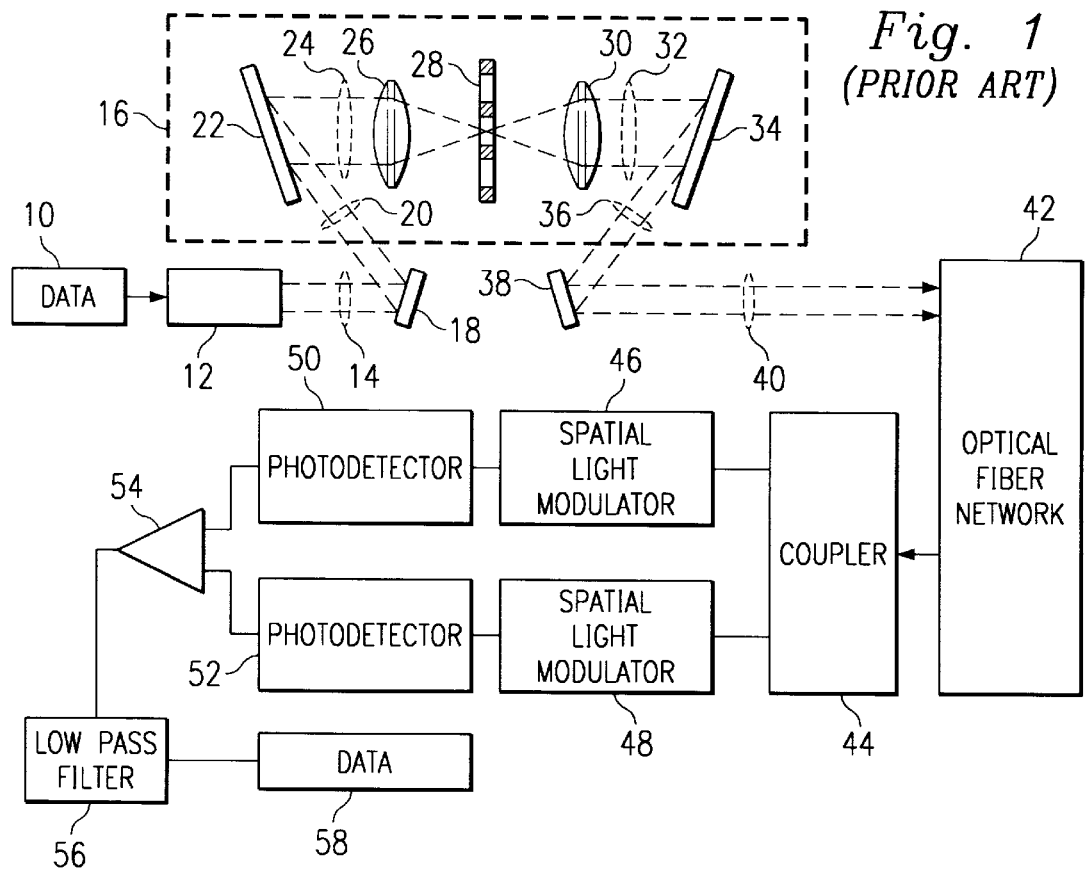
FIG. 1 illustrates a conventional optical fiber mediated CDMA communication system.
Figure 2:
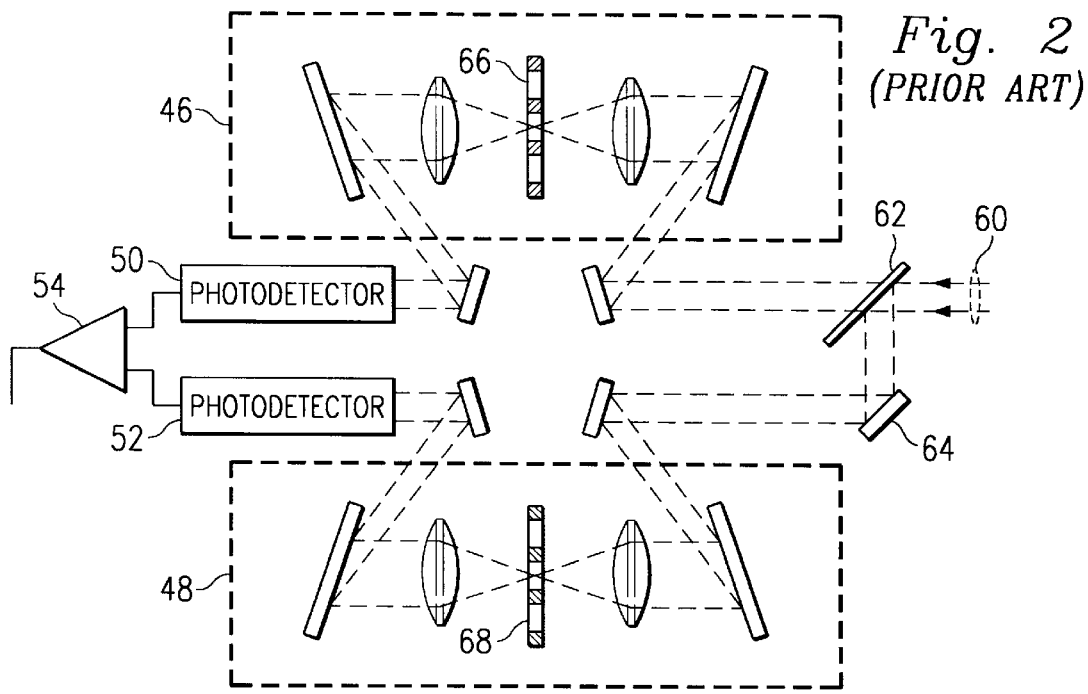
FIG. 2 provides a more detailed view of one receiver configuration that might be used in the system of FIG. 1.

The following applications are related to the present application and are each incorporated by reference in their entirety into this application:

1. "High Capacity Spread Spectrum Optical Communications System," application Ser. No. 08/752,211, filed Nov. 19, 1996.
2. "Optical CDMA System," attorney docket number 8731D-6558, filed concurrently herewith.
3. "Method and Apparatus for Noise Reduction in Optical CDMA," attorney docket number 8731D-6767, filed concurrently herewith.

DETAILED DESCRIPTION OF THE PREFERRED EMBODIMENTS

Particularly preferred embodiments of the present invention provide an optical fiber communications system using spread spectrum code division multiple access techniques to achieve better bandwidth utilization. The particular codes used in the most preferred embodiments of the present invention utilize sub-band coding in the frequency (wavelength) domain, with portions of the encoded spectrum being excluded for each of the channels to reduce the overlap and interference between different users on the system. A transmitting user in the system encodes the optical signal using a first coding mask, and a receiving user decodes the received signal using two decoding masks, all of the masks having nominal lengths N. If the users of the system are divided into two groups, each of the users within a group will be identified by a code chosen from a set of codes spanning one half of the spatially available spectrum.

In the encoder according to this example, the first mask is divided into two sections of length N/2 each, one of the sections providing a first sub-code of length N/2 for encoding data on that channel, while the other section blocks light and does not carry coded information. Each of the second and third decoding masks is also divided into two sections, with the sections on the two decoding masks corresponding to the two sections of the first mask. The section of the second decoding mask corresponding to the coded section of the first mask has a second code identical to the first code, and the section of the second decoding mask corresponding to the blocked section of the first encoding mask is also blocked. The section of the third decoding mask corresponding to coded section of the first encoding mask has a third code that is complementary to the first code, and the section of the third decoding mask corresponding to the blocked section of the first encoding mask is also blocked. Some users on the system have masks in which the first of the two sections is blocked and the second of the two sections is coded, while other users have masks in which the second of the two sections is blocked and the first of the two sections is coded. The first codes used to code the encoding masks are most preferably selected from a set of unipolar codes that are derived from a set of balanced bipolar orthogonal codes.

This exemplary system is configured to ensure that a group of users will experience interference with one half of the users on the system, with resultant improved performance. Increasing the number of independent groupings within the ensemble of users of the communication system can extend this strategy. Extension on this basis is limited by power considerations.

The CDMA encoding/decoding scheme according to the present invention may be applied in optical communication systems such as telecommunications systems, cable television systems, local area networks (LANs), as fiber backbone in communication networks, and the like. FIG. 4 illustrates the architecture of an exemplary optical communications system in which the present invention may be applied. A plurality of pairs of users $s_{11}$, $S_{12}$, $S_{21}$, $S_{22}$, ... $S_{N1}$, $S_{N2}$ are connected to an optical fiber medium 130. The first group of users $s_{11}$, $s_{21}$, ... $S_{N1}$ may be proximately located and coupled to the fiber 130 in a star configuration, and the second group of users $S_{12}$, $s_{22}$, ... $S_{N2}$ may be proximately located but remote from the first group and coupled to the fiber 130 in a star configuration. Alternatively, the users in the first group or the second group or both may be coupled to the fiber 130 at separate and distributed points, as shown in FIG. 5. The architecture of FIG. 4 may be more appropriate, for example, for a fiber backbone, whereas the architecture of FIG. 5 may be more appropriate for a telephone system.

Pairs of users $s_{j1}$, $s_{j2}$ communicate with each other using a channel of the optical fiber, and different pairs of users may simultaneously communicate over the same optical fiber. Each pair of users ($s_{j1}$, $s_{j2}$) is assigned a code $u_j$ for transmitting and receiving data between the two users, and different pairs of users are preferably assigned different codes. The transmitting user in a user pair, e.g. $s_{j1}$, encodes the optical signal using the code $u_j$ assigned to the user pair ($s_{j1}$, $s_{j2}$), and the receiving user $s_{j2}$ in the pair decodes the optical signal using the same code $u_j$. This architecture may be used, for example, for a fiber optic backbone of a communication network. The embodiments of the present invention are described as they may be applied in this network environment; other system architectures in which the invention is also applicable are described later.

Figure 6:
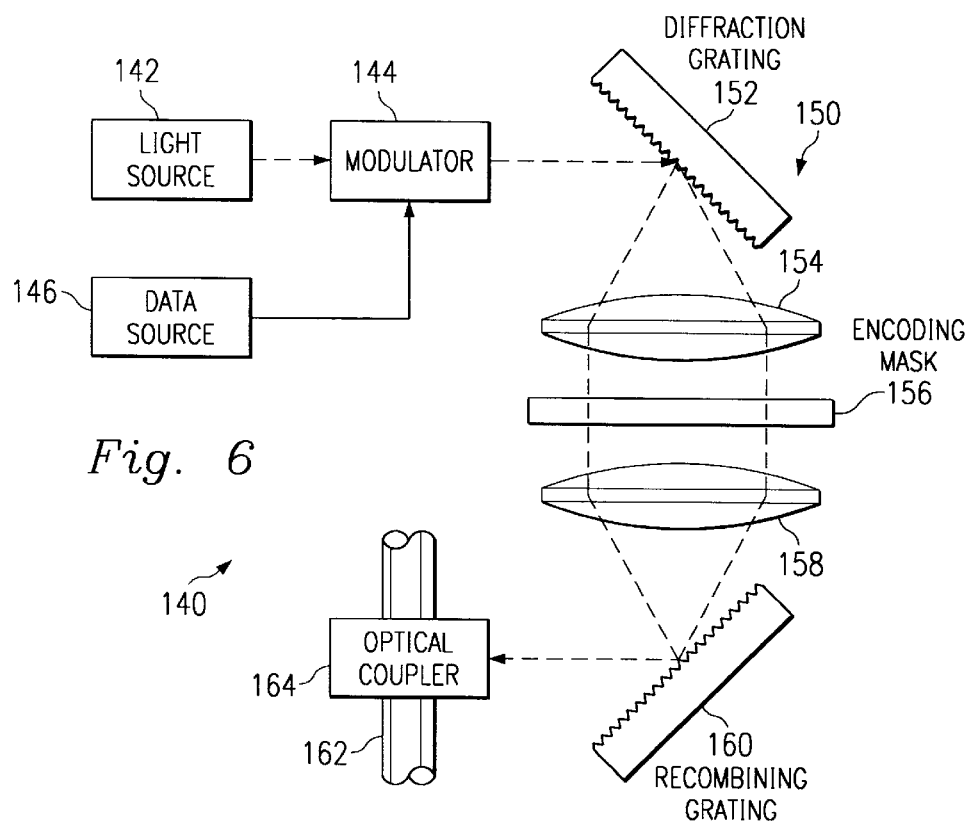
FIG. 6 is a block diagram of a first embodiment of an encoder according to the present invention.

FIG. 6 shows a first embodiment 140 of a CDMA modulator/encoder. A broadband light source 142, such as a super luminescent diode (SLD) or erbium-doped fiber source (EDFS), is coupled to an optical modulator 144. The optical modulator modulates the light from the optical source 142 based upon data or other information from the data source 146, using, for example, keying or pulse code modulation. Encoder 150, which is similar to the spatial light modulator 16 shown in FIG. 1, then spatially encodes the modulated broad-spectrum light beam. The encoder 150 includes a diffraction grating 152 that spatially spreads the spectrum of the modulated light beam along an axis and then is collimated by a collimating lens 154 where the collimated beam is passed through the encoding mask 156. The encoding mask, provides a spatially encoded, modulated beam of light that is collected by collimating lens 158 and combined back to a broad spectrum beam by a diffraction grating 160 for injection into the fiber 162, which may be a single mode optical fiber. An optical coupler 164 such as a star coupler, a Y coupler or the like is used to couple the encoded beam into the fiber 162. Alternatively, the light beam may be first encoded with the encoder 150 and then modulated by the modulator 144.

Figure 7:
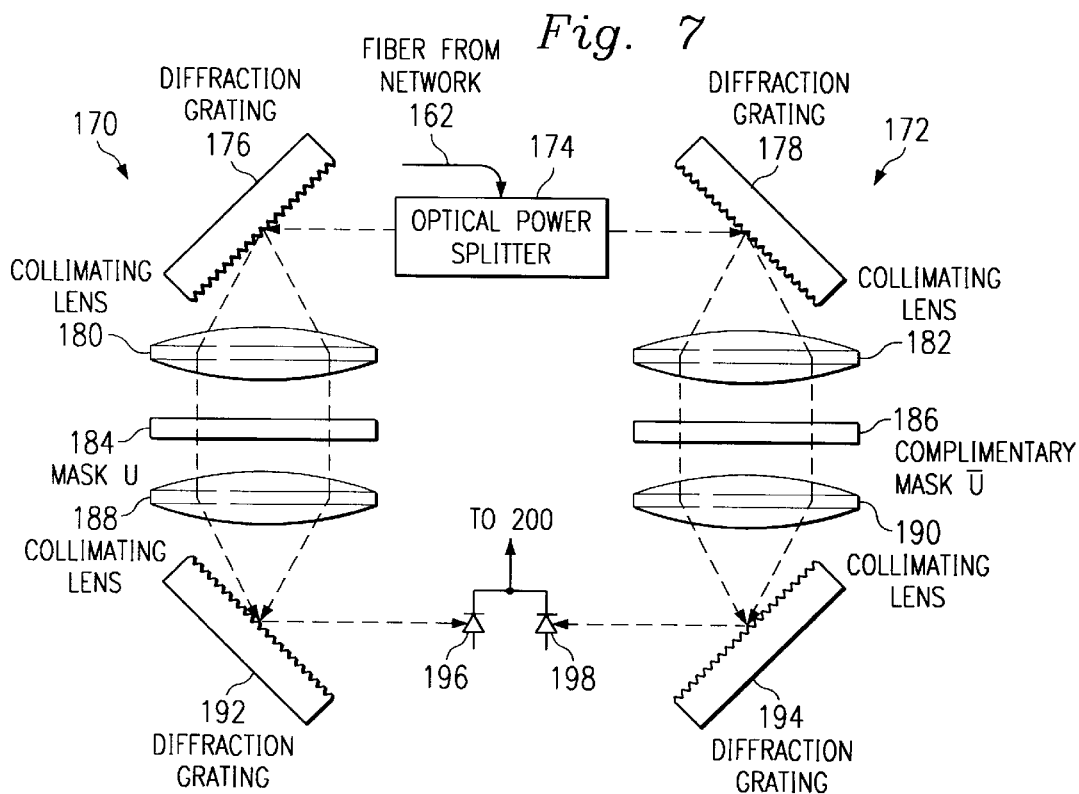
FIG. 7 is a block diagram of a first embodiment of a decoder according to the present invention.

FIG. 7 shows a compatible decoder, which has two channels 170 and 172. Light signals containing a potential plurality of spread spectrum signals are diverted from the fiber 162 using an optical coupler (not shown), and split into two beams through a beam splitter 174. One incoming beam is spread spatially along an axis by a diffraction grating 176 and is then collimated by a collimating lens 180 before being passed through a detection or decoding mask 184. The decoding mask 184 is, in this illustrated preferred embodiment, identical to the encoding mask 156. Light passed through the decoding mask 184 is passed through a collimating lens 188 and a diffraction grating 192 recombines the spatially spread light into a broad spectrum beam. In the other channel, the second component of the split, received beam is spread spatially by a diffraction grating 178 and is then collimated by a collimating lens 182 before being passed through a second decoding mask 186. Most preferably, in this binary unipolar Hadamard code embodiment of the decoder, this second decoding mask 188 is the bit-wise complement of the encoder mask 184. The beam, after being passed through the second decoding mask 186, is passed through the collimating lens 190 and a diffraction grating 194 to remove the spatial spreading. The output of the first decoder channel 170 may then be supplied to a photodetector 196 to convert the light into an electrical signal. Similarly, the output from decoder channel 172 is supplied to a photo detector 198 to convert the light into an electrical signal. The two electrical signals are then subtracted by the back-to-back arrangement of the two detector diodes, 196 and 198, for being supplied to data and clock recovery hardware and/or software 200. The two electrical signals may also be separately processed by two gain control circuits, respectively, to adjust for different losses in the two detector channels 170 and 172, before a difference calculation is performed. The differential electrical signal is then detected for data recovery. Data recovery for digital data streams may include, for example, integrating and square-law detecting the difference signal. Data recovery for analog signals may include, for example, low-pass filtering the difference signal.

Figure 8:
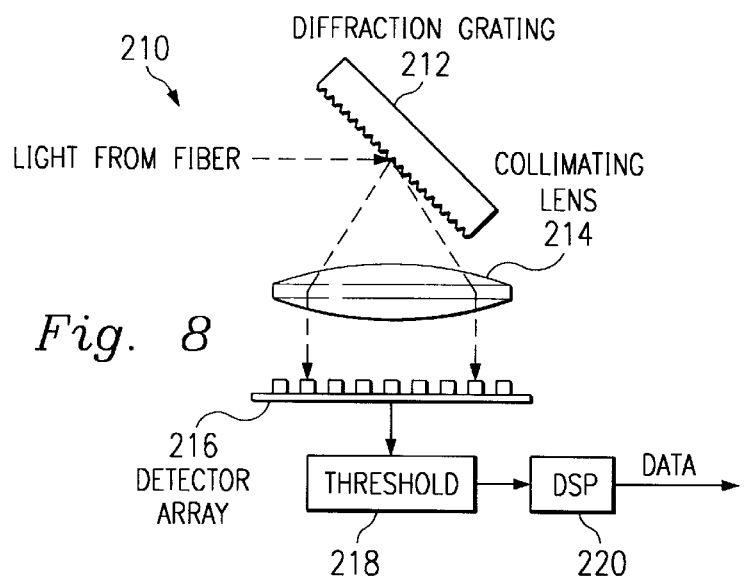
FIG. 8 is a block diagram of a second embodiment of a decoder according to the present invention.

FIG. 8 shows another embodiment of the decoder 210. In this embodiment, the beam of light received from the fiber is not split into two channels with two masks, but is instead spread by the grating 212 and is collimated by a lens 214. The collimated light is then intercepted by an array of detectors 216. The number of detectors in the array is equal to the number of bits in the encoder mask. Each detector position corresponds to the encoder mask bit position. The detector signal from each detector in the array is multiplied by either "1" or "−1" depending on whether the corresponding encoder mask bit is a "transparent" or "opaque." The results of all the multiplier outputs are then summed. The sum is then compared with a threshold 218 for data recovery.

This digital processing can be performed in discrete logic hardware or in a DSP 220 using software. When an analog mask is used for encoding, the outputs of the detectors may also be multiplied by numbers other than "1" or "−1". It should be noted that in both embodiments of FIGS. 6 and 7 only one encoder mask is used for transmitting data and no concatenated code is required in contrast with prior art designs.

The encoding and decoding scheme according to the present invention is explained next. As used in this specification, "unipolar codes" means code sequences comprising 1's and 0's in the case of binary codes, or code functions having values between 0 and 1 in the case of analog codes. "Bipolar codes" means code sequences comprising −1's and 1's in the case of binary codes, or code functions having values between −1 and 1 in the case of analog codes. A complement of a unipolar binary code u is (1−u), i.e. its bit-wise complement in which 0's are substituted by 1's and 1's are substituted by 0's. A complement of a unipolar analog code f is (1−f). Unipolar binary codes are used as an example in the following description.

In a CDMA system, the basic requirement for a spectral encoding/decoding scheme is that the decoding apparatus at a receiving user be able to recover data signals from the corresponding transmitting user while reducing or eliminating interference from signals from all other users. In a spread spectrum CDMA system using incoherent light source, because an incoherent optical system can only transmit positive signals (light intensities), and no phase information is available, only unipolar codes may be used for encoding. A unipolar binary code may be represented by a sequence of binary digits, such as $u_i$=110011110101011, where subscript i designates the $i^{th}$ user pair (or channel). The number of digits in the sequence, N, is referred to as the length of the code. In practice, for the particularly preferred binary unipolar code mask, each of the code values corresponds to a fixed interval slot, either transparent or opaque, on the spatially patterned mask that in turn corresponds to a fixed frequency or wavelength interval in the spatially modulated broad spectrum beam of light.

When a single mask is used for encoding and decoding, the codes are preferably chosen such that they are orthogonal, or:

$$u_i \cdot u_j = \begin{cases} M & \text{if } i = j \\ 0 & \text{if } i \neq j \end{cases} \quad (1)$$

where "•" denotes the bit-wise dot product of two codes, and M is a constant. When orthogonal codes are used, each transmitting user may transmit signals using a single encoding mask, and the corresponding receiving user may use a single decoding mask identical to the encoding mask to recover the signal from the corresponding transmitting user while rejecting interfering signals from all other users. This desirable outcome, however, occurs only when the codes are chosen to as the binary basis vectors:

$$u_1 = 000 \cdots 001$$
$$u_2 = 000 \cdots 010$$
$$\vdots$$
$$u_N = 100 \cdots 000$$

This set of codes is undesirable in that, since only one digit of the entire code is 1, only one frequency bin of mask passes power through it while the great majority of the bins are blocked. Such a system can be viewed as an incoherent wave division multiple access (WDMA) system. Such codes are undesirable as only about 1/N of the source power is transmitted and the rest of it is wasted.

In the encoding and decoding system described in FIGS. 6 and 7, in which a single mask is used for encoding and two masks are used for decoding, a set of unipolar codes may be used such that although a code $u_i$ in the set is not orthogonal to all other codes uj in the set, the code us is orthogonal to the difference between any other code $u_j$ and its complement $u_j^*$, i.e.

$$u_i \cdot (u - u_j^*) = \begin{cases} M' & \text{if } i = j \\ 0 & \text{if } i \neq j \end{cases} \quad (2)$$

where M' is a constant.

It can be seen that the decoders of embodiments of FIGS. 7 and 8 implement the principle of Eq. (2). In the embodiment of FIG. 7, the received light beam at a user j contains signals from all transmitting users i encoded with codes $u_i$. The first channel 170 having the mask 184 generates a light beam representing $u_i$•$u_j$, while the second channel having the complementary mask 186 generates a light beam representing $u_i$•$u_j^*$, and the differentially arranged detectors 196 and 198 generates the difference signal $u_i$•($u_j$−$u_j^*$). In the embodiment of FIG. 8, the array of detectors 216 outputs signals representing $u_i$, and the DSP 220 calculates $u_i$•($u_j$−$u_j^*$) based on the outputs of the detector array 73. According to Eq. (2), the difference signal $u_i$•($u_j$−$u_j^*$) is non-zero only for the signal from the user that uses a mask having a code $u_i$. Consequently, such decoders are able to recover the signals from the transmitting user i and reject signals from all other users.

A set of unipolar code that satisfy Eq. (2) may be derived from a set of balanced bipolar binary orthogonal codes $v_i$ that satisfy the following conditions:

$$v_i \cdot v_j = \begin{cases} M'' & \text{if } i = j \\ 0 & \text{if } i \neq j \end{cases} \quad (3)$$

and $$v_i \cdot 1 = 0 \quad (4)$$

where "1" represents a code in which every digit is 1. The unipolar codes $u_i$ are derived from the bipolar codes $v_i$ by substituting the −1's in $v_i$ with 0's, or $$u_i = \tfrac{1}{2}(v_i + 1) \quad (5)$$

The bipolar code $v_i$ is "balanced" in that they have equal numbers of 1's and −1's (eq. (4)). These particularly preferred unipolar codes us thus have equal numbers of 1's and 0's. As a result, half of the light power may be transmitted as signals, thereby promoting the efficient utilization of the source power.

An example of balanced bipolar orthogonal code set is a code set based on Hadamard matrices. A Hadamard matrix is a square matrix the elements of which are 1's or −1's such that all rows are orthogonal to each other and all columns are orthogonal to each other. For example, a 4×4 Hadamard matrix may be:

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

The column (or row) vectors except the first column (or row) of a Hadamard matrix provides a set of balanced bipolar binary orthogonal codes satisfying Eqs. (3) and (4). Thus, a set of unipolar codes $u_1, u_2, \ldots, u_n$ used in the unipolar spread spectrum CDMA system preferred in accordance with the present invention may be constructed by first constructing a Hadamard matrix of size n+1 or greater. Except the first column (or row), every column (or row) of this Hadamard matrix may be used to generate a unipolar code $u_j$ by replacing all $-1$'s with $0$'s.

For example, for a three-user system, the above 4×4 Hadamard matrix may be used to generate the following codes:

$$u_1 = [1 \ 0 \ 1 \ 0]$$
$$u_2 = [1 \ 1 \ 0 \ 0]$$
$$u_3 = [1 \ 0 \ 0 \ 1]$$

Although rules for constructing a general Hadamard matrices of arbitrary size do not exist, there are known methods for constructing Hadamard matrices of certain sizes. For example, Hadamard matrices having a size N that is a power of 2 may be constructed from $H_2$ $$H_2 = \begin{bmatrix} 1 & 1 \\ 1 & -1 \end{bmatrix}$$

using a recursive algorithm $$H_{2n} = \begin{bmatrix} H_n & H_n \\ H_n & -H_n \end{bmatrix}$$

Rules for constructing matrices having a size N that is a factor of 4 are also known.

Although Eqs. (3) and (4) indicate that the bipolar code set used to generate the unipolar codes should be orthogonal and balanced, in practice, it may be acceptable although not desired to use code sets that are "near orthogonal" or "near balanced." A code set is near orthogonal when, for example, $u_i \cdot u_j$ ($i \neq j$) is substantially smaller than $u_i \cdot u_i$. The codes are near balanced when, for example, $u_i \cdot 1$ is substantially smaller than N. For example, when the length N of the codes is large, changing a few digits of some codes in the set may result in a near orthogonal or near balanced code set. When the codes are not perfectly orthogonal or balanced but only near orthogonal or near balanced, interference from other users may increase and the system performance may deteriorate, but such deterioration may be acceptable so long as the overall system performance is acceptable. Thus, such near orthogonal or near balanced codes may be considered orthogonal or balanced for the purposes of the present invention and are within the scope thereof.

Figure 9:
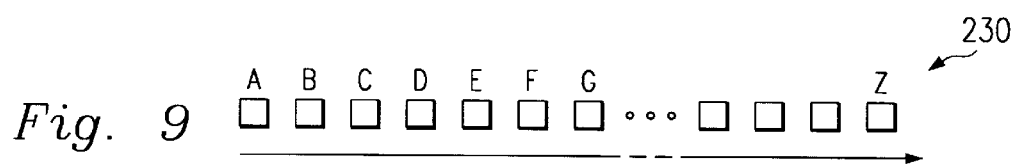
FIG. 9 is a sketch of a liquid crystal mask for use in a third embodiment of an encoder according to the present invention.

The coding masks 156, 184, 186 in FIGS. 6 and 7 may be either transmission or reflective. As a practical matter, however, the present inventors have observed that reflective masks are harder to make and do not usually have a desirably large extinction ratio. In some embodiments, the masks are made of liquid crystal material as shown in FIG. 9 divided into a plurality of cells "a" through "L", with L an arbitrary integer and being the maximum permitted length of the code. Such LCD masks are commercially available or are readily made using known technology. The cells form a one-dimensional array arranged along the axis 230 of spatial spectrum spreading caused by the diffraction grating 152. In one embodiment, the control of the cells is analog, meaning that the opacity of each cell is either infinitely adjustable or is adjustable in at least three or more separately controllable stages. Preferably a large number of Hadamard finite stages, preferably sixty-four or greater levels of opacity should be used. In another embodiment, the control is binary, and Walsh codes (unipolar Hadamard) are used. These masks can be implemented by LCD pixel arrays or by a photonic integrated circuit such as a solid state amplifier array. Alternately, and presently preferred for the reasons discussed below, the masks may be fixed and formed on glass blanks. For a reflective mask, the glass may be BK7 or quartz and the reflective regions could be gold. For the presently most preferred fixed, binary, transmission mask, the glass may still be BK7 or quartz and the blocking regions could be chrome.

Figure 10A:
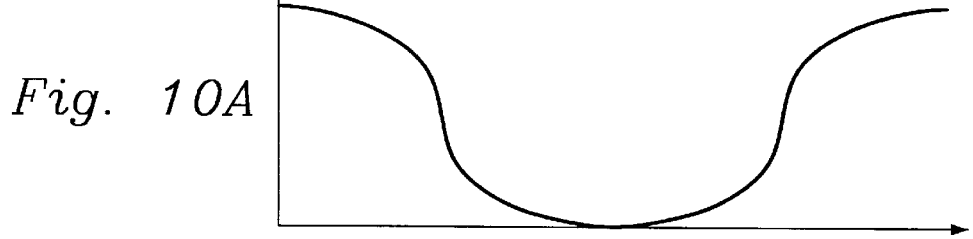
FIGS. 10A, B and C are continuous representations of discrete transparency functions for the mask of FIG. 9.
Figure 10B:
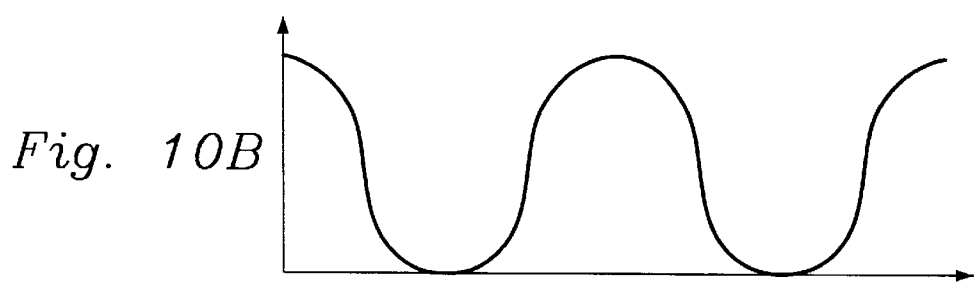
Figure 10C:
Figure 11:
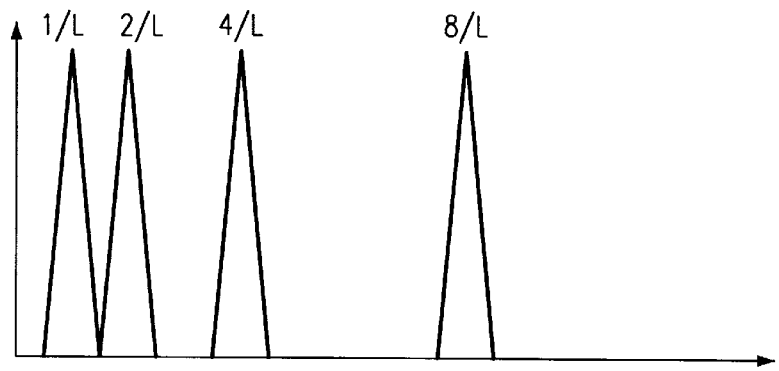
FIG. 11 is a graphical representation of a Fourier transform of light received from the fiber.

A preferred form of analog coding uses a set of unipolar wavelet functions fi derived from balanced bipolar orthogonal wavelet functions $g_i$ using $f_i = (g_i + 1)/2$. Eqs. (2)–(4), which are illustrated in the context of binary codes, apply equally to analog codes. In other words, if the bipolar wavelet functions satisfy Eqs. (3) and (4), then the derived unipolar wavelet functions satisfy Eq. (2). In one embodiment, the wavelet functions are discrete harmonic spatial sine waves (represented for purposes of illustration as continuous functions) as shown in FIG. 10. The ordinate axis is the axis along which the frequencies of the beam are spread and the abscissa is the relative transparency of the beam passing through a cell. In particular, a first encoder mask transparency function shown in FIG. 10A may have a spatial frequency of 1/L, where L is the number of cells. The mask of that first encoder is a discrete (as opposed to continuous) cosine wave in terms of transparency having one cycle over the frequency spectrum of L, such that the lowest and highest frequency portion of the encoded spectrum have the maximum intensity and the mid-range spectral frequencies have the lowest intensity. A second encoder mask may, for example, have a spatial frequency intensity mask of twice the frequency of the first encoder with two full cycles across the length of the encoder L of FIG. 10B. Still further a third encoder may have a frequency three times the frequency of the first encoder as shown in FIG. 10C. Other higher harmonics are preferably used, and preferably to maximize the system throughput, the maximum number of codes should be over one hundred and preferably over several hundred for higher usage systems.

The maximum number of harmonics or Walsh code bits (and therefore, the maximum number of codes) is limited only by the number of cells in the mask. For the analog mask, the number of different levels of opacity permitted in the mask, results in the quantization noise in the encoder. Alternatively, rather than using cosine waves, Chebyshev polynomials could also be used as they are orthogonal with respect to each other.

Using cosine waves for the encoding function also permits an easier decoder design. In particular, if one takes the spatial Fourier transform of the received signal, the received signal can be separated through a spatial filter for the frequency of the desired signal and then that signal can be recovered. As a simple example, FIG. 1, shows the Fourier transform of a signal received from a fiber where the separate encoded signals include 1/L, 2/L, 4/L and 8/L. Any one of these signals may be readily obtained by filtering for that particular spatial frequency in the received signal.

Figure 12A:
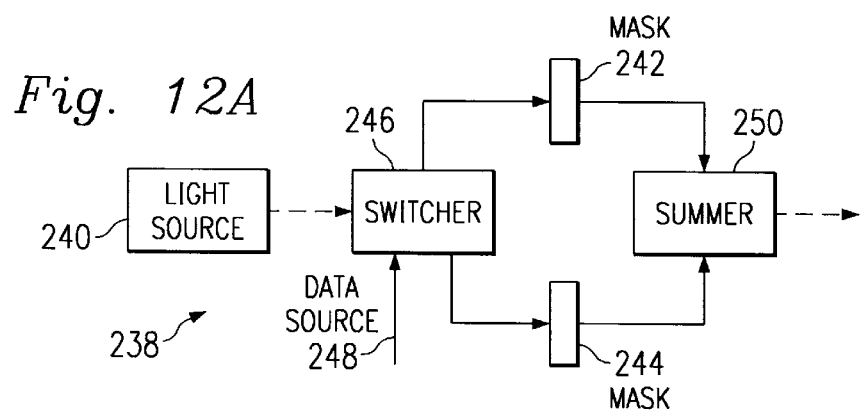
FIGS. 12A and B schematically illustrate an encoder and a decoder according to a third embodiment of the invention.

In a preferred third embodiment of the disclosed encoder, rather than pulse code modulate the data, an alternative method may be used for modulating signals using two codes as is shown in FIG. 12A. In this embodiment of an encoder 238, the optical path for the spatially spread light source 240 is switched between a first mask 242 and a second mask 244, which is complementary to the first mask 242, by a switcher 246 responsive to data from a data source 248, the first mask encoding the light to provide a digital "one" signal and the second mask encoding the light to provide a digital "zero" signal for the same code channel. The modulator switches the light path between two different encoder masks using one liquid crystal in a manner similar to the binary mask receiver embodiment. The light from both masks is then summed by a summer 250 and then provided to the optical communications channel such as an optical fiber (not shown).

Figure 12B:
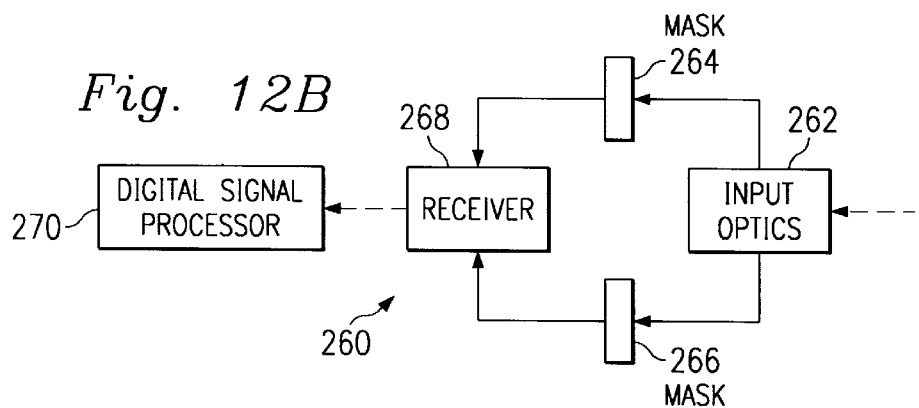

Receiving data proceeds in the converse manner as shown in FIG. 12B. A decoder 260 receives light from the communications channel and generates the spatially spread spectrum of the received light with receiving input optics 262 through masks 264, 266 which are identical to the mask 242 and the mask 244, respectively. The light from the masks 264 and 266 is then provided to a differential receiver 268 in the manner described above in the binary receiver embodiment. The signal from the receiver 268 may then be processed by a digital signal processor 270 for recovery of the data.

Figure 13A:
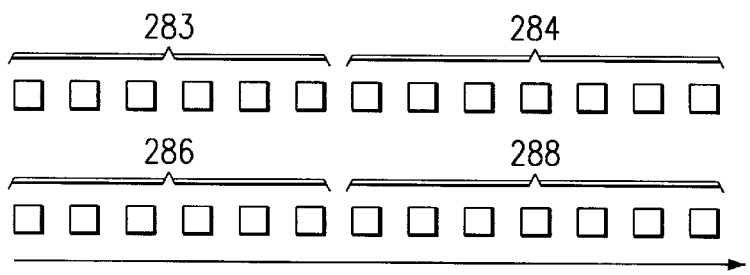
FIGS. 13A, B and C present a graphical representation of a mask and mask functions according to a next embodiment of the invention.
Figure 13B:
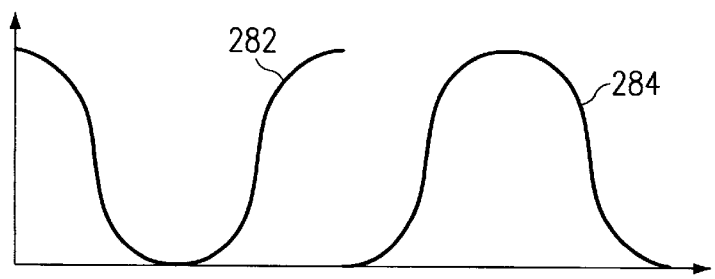
Figure 13C:
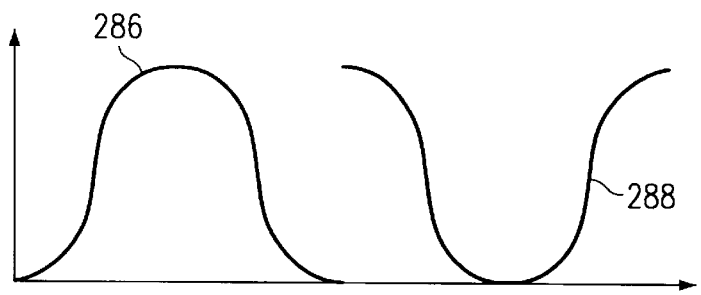

FIG. 13A shows one alternative embodiment of the masks appropriate for coding where two different masks are used for transmitting ones and zeros. In a first version, the mask formed of L cells in a liquid crystal mask 280 is divided into four parts, 282, 284, 286 and 288. Parts 282 and 284 comprise L/2 cells each along a first linear array arranged along the axis of spreading of the spectrum on a first row to encode a "one" for this particular code channel and at a second column, cells 286 and 288 also comprise L/2 cells arranged along the same axis for encoding a "zero" for this same channel. Preferably, the discrete transparency functions for parts 282, 284 are the complements of each other such as shown in FIG. 13B, where the ordinate represents spatial frequency and the abscissa represents intensity. For transmitting the other possibility (i.e. the zero), as shown in FIG. 13C, the complements of the discrete intensity functions for parts 286 and 288 are reversed. In other words, the portion of the mask in section 282 is identical to the portion of the mask in 288 and the portion of the mask in 284 is identical to the portion of the mask in 286.

In addition to having masks where the coding is complementary, it is also possible to provide coding where a first portion 282 of the mask is the orthogonal wave function and the second half is all opaque for a "zero" 284 and the second level, the first half 286 is all opaque and the second half is the same pattern as the first half 282 to make a "one." Alternatively, the first halves 282, 286 can be a first polynomial such as a sine wave and the second halves 284, 288 can be a second polynomial such as a Chebyshev function.

Although specific embodiments of encoders and decoders according to embodiments of the invention are disclosed, other embodiments of the invention are also possible. For example, while discrete wavelet functions are used for encoding, it is possible to have masks that permit continuous functions for coding. For example, the masks may be formed photographically.

The optical systems 150, 170 and 172 in the encoder of FIG. 6 and decoder of FIG. 7 may be generally referred to as optical chambers. An optical chamber, which may be a set of discrete optics or an integrated optical device, spectrally encodes an input broad band optical signal by selectively attenuating the spectral components of the signal according to a "code." The code, which may be binary or analog, determines the degree of attenuation of each spectral component of the input signal. In the illustrated embodiments, the optical chambers are implemented with diffraction gratings, collimating lenses and an optical mask having a code, but other implementations are also possible.

Furthermore, it should also be understood that all of the disclosed embodiments of encoders and decoders can also be applied to analog modulation of the optical signal.

Similarly, while only CDMA techniques have been described above, those of ordinary skill in the field will readily understand that depending upon system parameters, the system may also be used with wavelength (frequency) division multiplexing and time division multiplexing. For example, different coding schemes may be used for different portions of the optical spectrum so that wavelength division multiplexing may be used. In addition, the codes may be shared on a time sharing basis to provide for time division multiplexing. Also, optical spatial (spatial) CDMA can be combined with time-domain optical CDMA to increase the number of codes and the users in the network. In the time domain spread spectrum embodiments, several users are provided with different time domain spread spectrum codes for encoding the data before the data is provided to the optical encoder. However, these users can share the same wavelength encoding schemes discussed above. Of course, at the decoder, once the received optical information is converted back into the electrical digital domain, the digital signal must be processed according to the time domain spread spectrum code to recover the desired transmitted information.

In addition to the various different possible types of combinations of multiplexing schemes that are possible, various network algorithms may also be implemented. For example, the present invention may be applied to various fiber communication system architecture, such as a network environment shown in FIG. 5, in which a plurality of users $S_1, S_2, \ldots s_N$ are connected to an optical fiber medium 130 and each user $s_j$ may communicate with any other user $s_i$ over the optical fiber. Each user or node $s_j$ is assigned a code $u_j$ for receiving data from other users, and different users are preferably assigned different codes. When a user $s_i$ transmits data to a user $s_j$, the transmitting user $s_i$ encodes the optical signal using the code assigned to the receiving user $s_j$, and the receiving user decodes the signal using its assigned code. This may require that the transmitting user be able to dynamically vary the code it uses to transmit data depending upon the code of the intended recipient user. The codes for any one node may be assignable from one or more master nodes distributed throughout the network. Hence, when a node in a network comes on line, it requests a code or codes for encoding for selecting one of the possible spread spectrum channels over which to communicate. When that node leaves the network, the code that had been used by that particular node may be reassigned to a different node in the network. Various schemes may be used for making such requests such as CSMA/CD technique or token passing on a permanently assigned channel. Alternatively, token passing techniques may be used for gaining codes for securing one of the code division channels.

In addition, the disclosed embodiments permit an increase in the number of simultaneous users. In particular, in prior art schemes such as those discussed above, the maximum number of simultaneous users that are permitted for the same number of codes is $2^{N/2}$ where N is the maximum number of codes. However, in the disclosed embodiment, the maximum number of simultaneous users, while holding everything else constant, is $2^N$. Thus, total system throughput is dramatically increased, thereby permitting a system throughput of at least one half of a terabit, with the total system throughput being determined by the maximum number of simultaneous users, and the users data rate.

Figure 14:
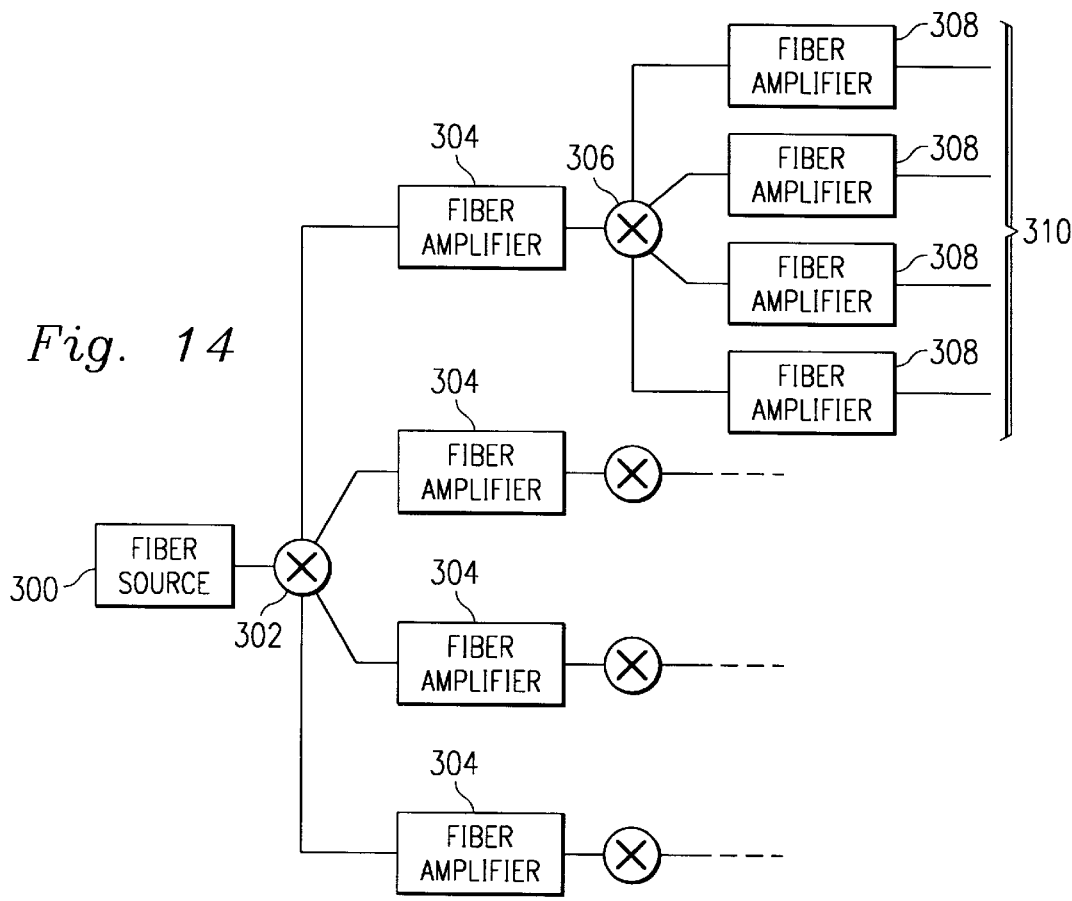
FIG. 14 schematically illustrates an apparatus for generating an array of N broad-spectrum optical sources having sufficient intensity to generate light beams for N channels of communication over a fiber using methods in accordance with the present invention.

A particularly preferred implementation of an overall optical fiber communication system in accordance with the present invention is now described and illustrated. This overall system may be used for adding capacity, i.e., increasing the bandwidth, of an optical communication system that connects plural users of an extended fiber optic connection. FIG. 14 illustrates a preferred apparatus for generating a plurality of broad-spectrum sources in a cost effective manner using a single erbium-doped fiber source and a hierarchy of erbium-doped fiber amplifiers to provide enough channels of sources, each with sufficient intensity for driving a channel of the optical communications system. As shown, a single erbium-doped fiber source 300 outputs light with an acceptably broad spectrum, generally providing a bandwidth of about 28 nanometers in wavelength over which the intensity of the source varies by less than about 5 dB. The 28-nanometer bandwidth corresponds to a system bandwidth of about 3.5 THz. The output of the erbium-doped fiber source, also known as a super luminescent fiber source, is provided over a fiber to a splitter such as a star coupler 302 which splits the input source signal and provides the output over four fibers to an array of four fiber amplifiers 304.

As the output of the fiber source 300 is split into four different sources, the intensity drops in the expected manner. Each of the four split off sources is thus amplified by the four fiber amplifiers to provide four broad-spectrum light beams preferably each having an intensity approximately equal to the original source 300 intensity. For the illustrated 128 channel system, this process is repeated through several further hierarchical stages. Thus, the outputs from the four fiber amplifiers 304 are provided over fibers to a corresponding set of four splitters 306, which may also be star couplers. The splitters 306 split the output from the fiber amplifiers into a plurality of outputs also of reduced intensity. The split off output from the splitters 306 are then provided to a further array of fiber amplifiers 308, which preferably amplify the intensity of the plural channels of broad-spectrum light to provide a next set of source light beams 310 having an appropriate intensity. This process is repeated until a sufficient number of broad-spectrum sources having an appropriate intensity are generated, for example 128 independent sources for the illustrative 128-channel fiber communication system. This hierarchical arrangement is preferred as using a single originating source and a number of fiber amplifiers to obtain the desired set of broad-spectrum light sources, which advantageously takes advantage of the lower price of fiber amplifiers as compared to the fiber source.

After sufficient channels of source light have been generated, the channels of source light are provided to an array of spatial light modulators or encoders like that shown in FIG. 6. The 128 different encoders use a 128-bin mask to spatially encode the input light signal, with each of the 128 masks presenting a different one of a unipolar Hadamard code vector generated in the manner discussed above. Most preferably, each of the masks is a fixed mask for use in a transmission mode, with the mask having a total of 128 equal sized bins, with the bins spanning the usable width of the linear mask. Thus, the 128 bins span a total of about 3.5 THz (28 nanometers) in bandwidth, with each adjacent bin defining a subsequent frequency interval providing about 25 GHz of bandwidth. Each of the equal sized bins of the fixed mask is assigned according to the code vector to have one or the other of two binary values. One of the two binary values is identified by blocking chrome stripe on the glass substrate of the mask and the other binary value is identified by an unblocked, transparent stripe on the glass substrate. Each of the 128 channels of the communication system is then defined by a distinct spatial encoding function and each of the channels is also modulated with a time-domain signal, for example using a modulator 144 like that shown in FIG. 6. After the various channels are modulated both spatially (equivalently, frequency) and temporally, the 128 channels are combined and injected into a fiber.

Long distance transmission for this fiber communication system is managed in a manner similar to the manner other conventional fiber communication systems are managed. As is conventional, it is typical to use a single mode fiber. In addition, the signals on the fiber will undergo dispersion and losses. It is preferable that the signals on the fiber be amplified using a conventional fiber doped amplifier at regular intervals, for example, every forty to eighty kilometers.

At the other end of the transmission fiber, the combined light signals are split, amplified, and provided to an array of 128 receivers, each corresponding to one of the fixed mask channels defined by the 128 transmitters coupled into the fiber. The primary purpose of the illustrated embodiment is to expand the usage or loading on the fiber, so the receivers also include fixed masks so that each receiver is dedicated to a single one of the 128 channels. The receivers, which may have the structure shown in FIG. 7, are each dedicated to a particular channel defined by a particular transmitter by including within the receiver one mask identical to the transmitter mask and a second mask that is the bit-wise complement of the transmitter mask. As discussed above, it is possible and in other embodiments desirable to provide either the receiver or the transmitter with a variable mask such as one using a programmable LCD element. For the illustrated embodiment, however, the use of fixed masks on both the transmitting and receiving ends of the communication system provides a reduced cost system that provides significantly improved bandwidth for a high volume fiber link.

Figure 15:
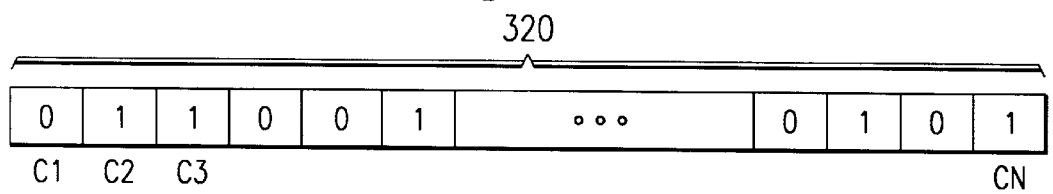
FIG. 15 presents a different representation of the mask of FIG. 9.

According to a particularly preferred embodiment, the fixed mask, 128 channel system described here is used in coordination with a sub-band coding method. As shown in FIG. 15, a coding mask 320 without sub-band coding (either an encoding mask 156 or a decoding mask 184 or 186) is made of an array of cells $c_1$ through $c_N$ that span the useable width of the mask. Preferably, the masks are made of a liquid crystal material divided into a plurality of cells forming a one-dimensional array. Alternately, the masks may be a fixed mask, most preferably a transmission mask, consisting of a glass substrate and selective cells covered with a blocking chrome stripe. Each cell can be selected to attenuate the intensity of the light beam passing through it. For a binary mask, cells are either opaque or transparent; for an analog mask, the cells have at least three levels of opacity. A binary mask is represented by a binary code, which is a sequence of 0's (opaque cells) and 1's (transparent cells). An analog mask is represented by an analog code, which is a function having values between 0 and 1. Binary masks are illustrated in FIGS. 10 and 13 as an example.

Figure 16A:
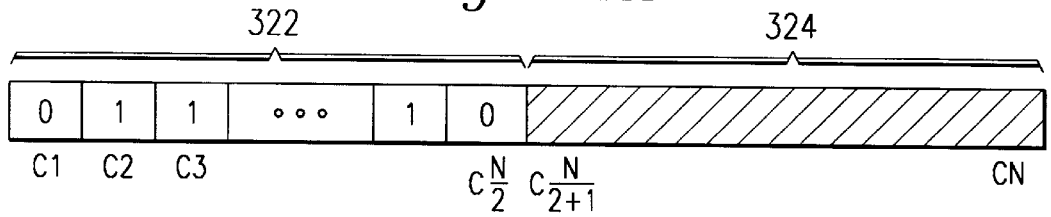
FIGS. 16A and 16B illustrate coding masks according to an embodiment of the present invention.
Figure 16B:
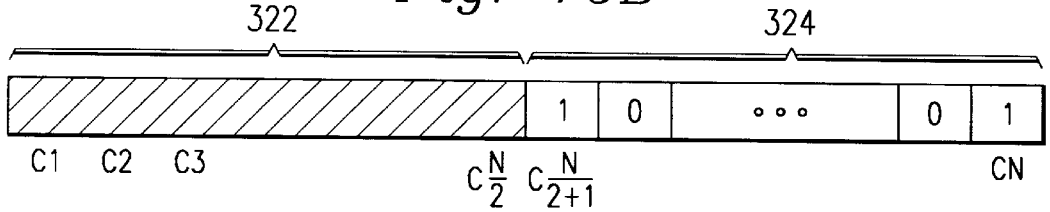

FIG. 16A shows a mask according to an embodiment of the present invention. The mask is divided into two sections 322 and 324, each comprising N/2 cells (N being an even number). One of the two sections, such as section 324, is blocked. In other words, every cell in the section 324 is opaque. The cells in the other section 322, on the other hand, are either opaque (represented by 0 in FIG. 16A) or transparent (represented by 1). The array of cells in the section 322 represents a binary code u of length N/2. The code u is selected from a set of unipolar codes that satisfy the conditions discussed above. The total number of codes in the unipolar code set $u_i$ of length N/2 is N/2−1. Thus, the system may support a first group of N/2−1 users, each user having a mask in which the section 324 is blocked as shown in FIG. 16A, and in which the section 322 is represented by a unique code $u_i$. In addition, the system may support a second group of N/2−1 users, each user having a mask in which the section 322 is blocked as shown in FIG. 16B, and in which the section 324 is represented by a unique code $u_j$. The total number of users supported by the system is therefore N−2.

This may be comparable to a system as shown in FIG. 15, in which the entire mask of length N is used for coding, rather than having half of the mask blocked. Since the unipolar codes representing the entire mask are of length N, the system can support a total of N−1 users with unique codes. Thus, the total number of users supported by the two systems are comparable when N is a large number.

It has been found that due to the signal-to-interference relationship, the maximum data rate of each user is inversely proportional to the total number of users that transmit in the same spectral range and thus interfering with each other. Thus, in the system of FIGS. 16A and 16B, each user only has N/2−2 interfering users transmitting in the same spectral range, as users in different groups do not interfere with each other. In the system of FIG. 15, on the other hand, each user has N−2 interfering users transmitting in the same spectral range. Thus, each user in the system of FIGS. 16A and 16B can transmit signals at a data rate that is approximately twice as high as the data rate that can be used by a user in the system of FIG. 15. As a result, the system throughput, which is the product of each user's data rate and the total number of users supported by the system, is approximately twice as high in the system of FIGS. 16A and 16B, where the mask is divided into two sections, as compared to the system of FIG. 15, where the entire length of the mask is used for coding.

The system of FIGS. 16A and 16B, on the other hand, is approximately half as efficient as the system of FIG. 15 in terms of source power utilization. Since half of the mask is blocked, only half of the spectral range of the source power in is utilized for data transmission.

Generally speaking, the masks of length N may be divided into M sections of equal lengths with one section coded and all other sections blocked. The system throughput will be increased by a factor of approximately M, at a cost of reduced power efficiency by a factor of M.

Figure 17A:
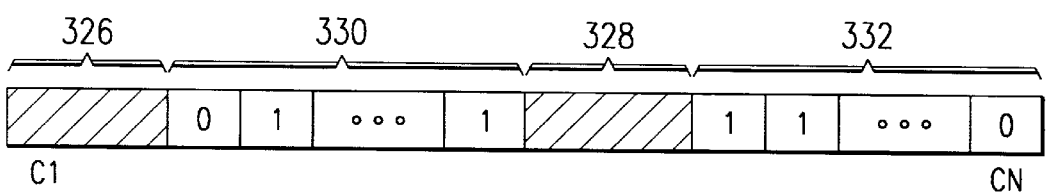
FIGS. 17A and 17B illustrate coding masks according to another embodiment of the present invention.
Figure 17B:
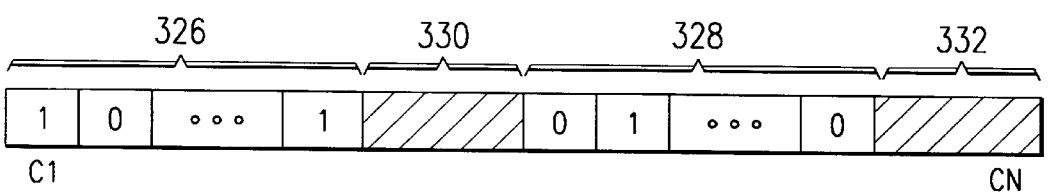

In addition, although in the masks shown in FIGS. 16A and 16B, the coded section 322 and the blocked section 324 each comprises contiguous cells, these sections may be made of non-contiguous sub-sections of cells, such as those shown in FIGS. 17A and 17B. The mask of length N in FIG. 6A is divided into four sub-sections of lengths N/4. Sub-sections 326 and 328 combine to form the blocked section while sub-sections 330 and 332 combine to form the coded section. Other sub-section arrangements may also be used, including those with different numbers of groups into which the users within the overall system are divided.

Although the embodiments of the present invention have been described in a system employing the encoding/decoding scheme of FIGS. 6 and 7, the invention may also be applied in systems employing other CDMA encoding/decoding schemes.

While the present invention has been described with particular emphasis on certain preferred embodiments of the present invention, the present invention is not limited to the particular embodiments described herein. Those of ordinary skill will appreciate that certain modifications and variations might be made to the particular embodiments of the present invention while remaining within the teachings of the present invention. For example, while the above embodiments have been presented in terms of communications systems mediated over fiber, aspects of the present invention are immediately used in an over the air optical system. As such, the scope of the present invention is to be determined by the following claims.

What is claimed is:

1. In an optical code-division multiple access communication system in which a plurality of users are connected to an optical fiber, at least one user transmitting optical signals over the fiber and at least one user receiving optical signals from the fiber, an encoding apparatus at the transmitting user for generating a modulated and encoded beam of light carrying a data signal, the encoding apparatus comprising:

a broad band light source for providing a beam of light;

an optical modulator for modulating the intensity of the beam of light according to the data signal;

a first optical chamber having a first code, the first code having a sequence of digits each having one of at least two values, the first optical chamber defining a plurality of spectral components in the beam of light each corresponding to a digit of the first code, the first optical chamber attenuating the intensity of each spectral component of the beam of light according to the value of the corresponding digit of the first code to generate an encoded beam of light, wherein a spectral component is substantially completely removed when the corresponding code digit has a first value;

wherein the first code comprises a first and a second section of identical lengths, wherein the first section defines a first sub-code and wherein each digit in the second section has the first value; and wherein the first sub-code is selected from a set of unipolar codes in which each code in the set is orthogonal to the difference between any other code in the set and the complement of the other code; and an optical coupler for injecting the modulated and encoded beam of light into the optical fiber.

2. In the optical communication system of claim 1, a decoding apparatus at the receiving user for decoding the light signal carried by the optical fiber and recovering the data signal transmitted by the transmitting user, the decoding apparatus comprising:

an optical power splitter for diverting a portion of the light signal carried by the optical fiber;

a beam splitter for splitting the diverted light signal into a first and a second beam of light;

a second optical chamber having a second code, the second code having a sequence of digits each having one of at least two values, the second optical chamber defining a plurality of spectral components in the first beam of light each corresponding to a digit of the second code, the second optical chamber attenuating the intensity of each spectral component of the first beam of light according to the value of the corresponding digit of the second code to generate a first decoded beam of light;

wherein the second code comprises a first and a second section of identical lengths corresponding to the first and second sections of the first code, wherein the first section of the second code defines a second sub-code that is identical to the first sub-code and wherein each digit in the second section of the second code has the first value;

a third optical chamber having a third code, the third code having a sequence of digits each having one of at least two values, the third optical chamber defining a plurality of spectral components in the second beam of light each corresponding to a digit of the third code, the third optical chamber attenuating the intensity of each spectral component of the second beam of light according to the value of the corresponding digit of the third code to generate a second decoded beam of light, wherein the third code is complementary to the first code;

wherein the third code comprises a first and a second section of identical lengths corresponding to the first and second sections of the first code, wherein the first section of the third code defines a third sub-code that is complementary to the first sub-code and wherein each digit in the second section of the third code has the first value; and a light detector for detecting the first and second decoded beams of light and for generating an output signal representing the intensity difference of the first and second decoded beams of light, whereby the output signal represents the data signal to be recovered.

3. In an optical code-division multiple access communication system in which a plurality of users are connected to an optical fiber, at least one user transmitting optical signals over the fiber and at least one user receiving optical signals from the fiber, a method for encoding and decoding a data signal, the encoding method comprising:

providing a beam of broad band light having a plurality of spectral components;

modulating the intensity of the beam of light according to the data signal;

spectrally encoding the beam of light according to a first code, the code having a sequence of digits each corresponding to a spectral component in the light beam, each digit having one of at least two values, wherein the spectral encoding is performed by attenuating the intensity of each spectral component of the light beam according to the value of the corresponding digit of the first code to generate an encoded beam of light, wherein a spectral component is substantially completely removed when the corresponding code digit has a first value; and wherein the first code comprises a first and a second section of identical lengths, wherein the first section defines a first sub-code and wherein each digit in the second section has the first value; and wherein the first sub-code is selected from a set of unipolar codes in which each code in the set is orthogonal to the difference between any other code in the set and the complement of the other code; and injecting the modulated and encoded beam of light into the optical fiber; and the decoding method comprising:

diverting a portion of the beam of light from the optical fiber;

splitting the diverted beam of light into a first and a second beam of light;

spectrally decoding the first beam of light according to a second code, the second code having a sequence of digits each corresponding to a spectral component in the light beam, each digit having one of at least two values, wherein the spectral decoding is performed by attenuating the intensity of each spectral component of the light beam according to the value of the corresponding digit of the second code; and wherein the second code comprises a first and a second section of identical lengths corresponding to the first and second sections of the first code, wherein the first section of the second code defines a second sub-code identical to the first sub-code and wherein each digit in the second section of the second code has the first value; and spectrally decoding the second beam of light according to a third code, the third code having a sequence of digits each corresponding to a spectral component in the light beam, each digit having one of at least two values, wherein the spectral decoding is performed by attenuating the intensity of each spectral component of the light beam according to the value of the corresponding digit of the third code; and wherein the third code comprises a first and a second section of identical lengths corresponding to the first and second sections of the first code, wherein the first section of the third code defines a third sub-code complementary to the first sub-code and wherein each digit in the second section of the third code has the first value;

differentially detecting the first and second spectrally decoded beams of light to generate an output signal, whereby the output signal represents the data signal.

* * * * *